United States Patent
Terada et al.

(10) Patent No.: US 10,476,086 B2
(45) Date of Patent: Nov. 12, 2019

(54) RESIN-FRAMED STEPPED MEMBRANE ELECTRODE ASSEMBLY FOR FUEL CELL

(71) Applicant: HONDA MOTOR CO., LTD., Tokyo (JP)

(72) Inventors: Eri Terada, Wako (JP); Kazuo Nunokawa, Wako (JP); Satoru Terada, Wako (JP); Masaki Tani, Wako (JP); Shintaro Tanaka, Wako (JP); Seiji Sugiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 15/452,732

(22) Filed: Mar. 8, 2017

(65) Prior Publication Data
US 2017/0263952 A1   Sep. 14, 2017

(30) Foreign Application Priority Data

Mar. 9, 2016  (JP) .................................. 2016-045388

(51) Int. Cl.
| H01M 8/02 | (2016.01) |
| H01M 8/0273 | (2016.01) |
| H01M 8/1004 | (2016.01) |
| H01M 8/1018 | (2016.01) |

(52) U.S. Cl.
CPC ....... *H01M 8/0273* (2013.01); *H01M 8/1004* (2013.01); *H01M 8/1018* (2013.01); *H01M 2008/1095* (2013.01)

(58) Field of Classification Search
CPC ............ H01M 8/0273; H01M 8/1004; H01M 8/1018; H01M 2008/1095
See application file for complete search history.

(56) References Cited

U.S. PATENT DOCUMENTS

| 2013/0183604 A1* | 7/2013 | Tanaka ................ H01M 8/0289 429/480 |
| 2014/0287338 A1* | 9/2014 | Tanaka ................ H01M 8/1004 429/481 |

FOREIGN PATENT DOCUMENTS

| JP | 2009004230 A | * | 1/2009 |
| JP | 2013-168353 |   | 8/2013 |

OTHER PUBLICATIONS

English machine translation of Yashuhiro et al. (JP 2009004230 A) (Year: 2009).*

* cited by examiner

*Primary Examiner* — Cynthia K Walls
(74) *Attorney, Agent, or Firm* — Mori & Ward, LLP (57) ABSTRACT

A resin-framed stepped membrane electrode assembly for a fuel cell, includes a stepped membrane electrode assembly and a resin frame member. The resin frame member surrounds a membrane outer periphery end of a solid polymer electrolyte membrane and includes an inner protruding portion protruding from the membrane outer periphery end toward a second electrode and is joined to the stepped membrane electrode assembly with an adhesive. The inner protruding portion includes a bank portion, a groove portion, and a ledge portion. The roughness of the bank surface is smaller than a roughness of the groove surface.

6 Claims, 6 Drawing Sheets

RESIN-FRAMED STEPPED MEMBRANE ELECTRODE ASSEMBLY FOR FUEL CELL

CROSS-REFERENCE TO RELATED APPLICATIONS

The present application claims priority under 35 U.S.C. § 119 to Japanese Patent Application No. 2016-045388, filed Mar. 9, 2016, entitled "Resin-framed Stepped Membrane Electrode Assembly For Fuel Cell." The contents of this application are incorporated herein by reference in their entirety.

BACKGROUND

1. Field

The present disclosure relates to a resin-framed stepped membrane electrode assembly for fuel cell.

2. Description of the Related Art

Typically, a solid polymer electrolyte fuel cell includes a solid polymer electrolyte membrane formed of a polymer ion exchange membrane. A fuel cell includes a membrane-electrode assembly (MEA) that includes a solid polymer electrolyte membrane, an anode electrode disposed on one the surfaces of the solid polymer electrolyte membrane, and a cathode electrode disposed on the other surface of the solid polymer electrolyte membrane. The anode electrode and the cathode electrode each include a catalyst layer (electrode catalyst layer) and a gas diffusion layer (porous carbon).

The MEA is sandwiched between separators (bipolar plates) to constitute a power generation cell (unit fuel cell). A particular number of power generation cells are stacked and used as a vehicle-mounted fuel cell stack, for example.

The MEA may be configured as a stepped MEA. A stepped MEA is a type of MEA in which one of the gas diffusion layers is designed to have smaller flat dimensions than the solid polymer electrolyte membrane and the other gas diffusion layer is designed to have larger flat dimensions than the aforementioned gas diffusion layer. In order to decrease the amount of the costly solid polymer electrolyte membrane to be used and in order to protect the solid polymer electrolyte membrane, which is a thin film with low strength, a resin frame member is attached around the outer periphery of the MEA. Such a resin-framed MEA has been available.

In order to reduce occurrence of cracks and strain in the solid polymer electrolyte membrane of a resin-framed MEA, the joint strength between the stepped MEA and the resin frame member is preferably maintained at a satisfactory level. For example, Japanese Unexamined Patent Application Publication No. 2013-168353 discloses such a resin-framed stepped MEA (resin-framed MEA) for a fuel cell.

The resin frame member of this resin-framed MEA includes an inner periphery protruding portion. The inner periphery protruding portion protrudes toward the outer periphery of a second electrode smaller than a first electrode and is bonded and joined to an outer peripheral portion of the solid polymer electrolyte membrane. The bonded surface of the inner periphery protruding portion has a textured portion. Thus, the inner periphery protruding portion of the resin frame member can be strongly and easily bonded and joined to the outer peripheral portion of the solid polymer electrolyte membrane and the joint strength of the entire resin-framed MEA can be reliably maintained, according to the description of the aforementioned publication.

SUMMARY

According to one aspect of the present invention, a resin-framed stepped membrane electrode assembly for a fuel cell, includes a stepped membrane electrode assembly and a resin frame member. The stepped membrane electrode assembly includes a solid polymer electrolyte membrane, a first electrode, and a second electrode. The first electrode is disposed on a surface of the solid polymer electrolyte membrane and includes a first electrode catalyst layer and a first gas diffusion layer. The second electrode is disposed on another surface of the solid polymer electrolyte membrane and includes a second electrode catalyst layer and a second gas diffusion layer. The first electrode has flat dimensions larger than flat dimensions of the second electrode. The second electrode catalyst layer includes an outer periphery exposed portion extending outward from an outer peripheral end of the second gas diffusion layer. The resin frame member surrounds an outer periphery of the solid polymer electrolyte membrane. The resin frame member includes an inner protruding portion protruding toward the second electrode and joined to the stepped membrane electrode assembly with an adhesive. The inner protruding portion includes a bank portion, a groove portion, and a ledge portion. The bank portion is disposed in an inner peripheral end portion of the inner protruding portion. The bank portion faces the outer periphery exposed portion of the second electrode catalyst layer. The groove portion is disposed on an outer peripheral side of the bank portion. The ledge portion is disposed on an outer peripheral side of the groove portion so as to contact an outer peripheral surface of the solid polymer electrolyte membrane, the outer peripheral surface being an exposed portion extending outward from the second electrode catalyst layer. A surface roughness of a tip of the bank portion is smaller than a surface roughness of a bottom surface of the groove portion.

According to another aspect of the present invention, a resin-framed stepped membrane electrode assembly for a fuel cell, includes a stepped membrane electrode assembly and a resin frame member. The stepped membrane electrode assembly includes a solid polymer electrolyte membrane, a first electrode, and a second electrode. The solid polymer electrolyte membrane has a first surface and a second surface opposite to the first surface in a stacking direction. The first electrode is stacked on the first surface in the stacking direction and includes a first electrode catalyst layer and a first gas diffusion layer. The second electrode is stacked on the second surface in the stacking direction and includes a second electrode catalyst layer and a second gas diffusion layer. The first electrode is larger than the second electrode viewed in the stacking direction. The second electrode catalyst layer includes an outer periphery exposed portion extending from a diffusion outer peripheral end of the second gas diffusion layer in a direction substantially perpendicular to the stacking direction viewed in the stacking direction. The resin frame member surrounds a membrane outer periphery end of the solid polymer electrolyte membrane viewed in the stacking direction and includes an inner protruding portion protruding from the membrane outer periphery end toward the second electrode viewed in the stacking direction and is joined to the stepped membrane electrode assembly with an adhesive. The inner protruding portion includes a bank portion, a groove portion, and a ledge portion. The bank portion is disposed between the diffusion outer peripheral end and the membrane outer periphery end in the direction viewed in the stacking direction and has a bank surface opposite to the outer periphery exposed portion in the stacking direction. The groove portion is disposed between the bank portion and the membrane outer periphery end in the direction viewed in the stacking direction and has a groove surface opposite to the solid polymer electrolyte membrane in the stacking direction. The roughness of the bank surface is smaller than a roughness of the groove surface. The ledge portion is disposed between the groove portion and the membrane outer periphery end in the direction viewed in the stacking direction so as to contact to the solid polymer electrolyte membrane in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
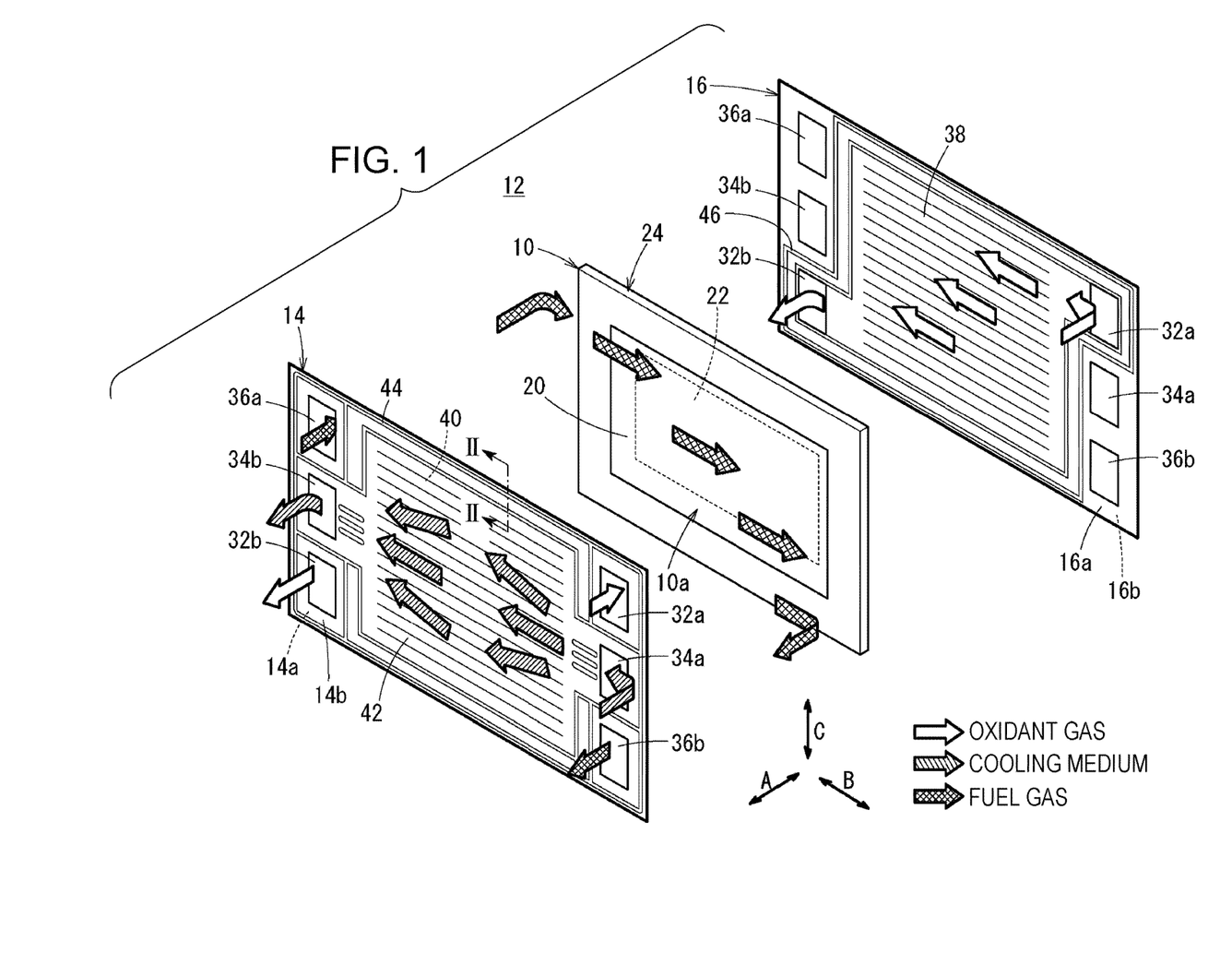
FIG. 1 is an assembly perspective view of a relevant part of a solid polymer fuel cell into which a resin-framed stepped MEA according to an embodiment is mounted.
Figure 2:
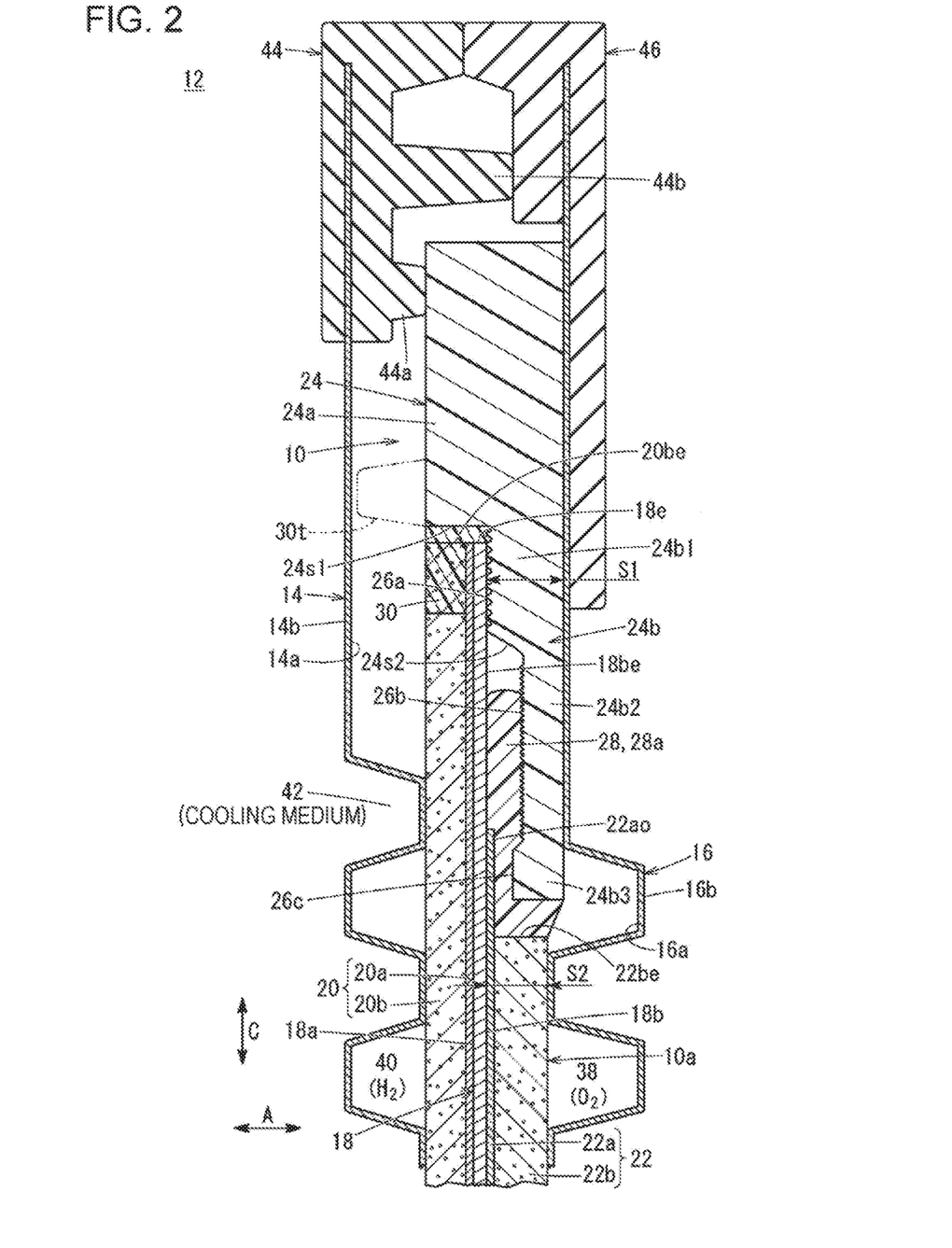
FIG. 2 is a cross-sectional view of the fuel cell taken along line II-II in FIG. 1.

Referring to FIGS. 1 and 2, a resin-framed stepped membrane-electrode assembly (MEA) 10 for a fuel cell according to one embodiment is set in a landscape-oriented (or portrait-oriented) oblong solid polymer electrolyte fuel cell 12. Two or more solid polymer electrolyte fuel cells 12 are stacked in, for example, the arrow A direction (horizontal direction) or the arrow C direction (direction of gravitational force) so as to form a fuel cell stack. The fuel cell stack is mounted in a fuel cell electric vehicle (not illustrated) to serve as a vehicle-mounted fuel cell stack, for example.

In the fuel cell 12, the resin-framed stepped MEA 10 is sandwiched between a first separator 14 and a second separator 16. The first separator 14 and the second separator 16 each have a landscape-oriented (or portrait-oriented) oblong shape. The first separator 14 and the second separator 16 are each formed of, for example, a steel sheet, a stainless steel sheet, an aluminum sheet, a plated steel sheet, a metal sheet subjected to anti-corrosion surface treatment, a carbon member, or the like.

The oblong resin-framed stepped MEA 10 includes a stepped MEA 10a. As illustrated in FIG. 2, the stepped MEA 10a includes a solid polymer electrolyte membrane (cation exchange membrane) 18 which is a water-impregnated perfluorosulfonic acid thin membrane. The solid polymer electrolyte membrane 18 is sandwiched between an anode electrode (first electrode) 20 and a cathode electrode (second electrode) 22. The solid polymer electrolyte membrane 18 may be a fluorine-based electrolyte or hydrocarbon (HC)-based electrolyte.

The cathode electrode 22 has smaller flat dimensions (outer dimensions) than the solid polymer electrolyte membrane 18 and the anode electrode 20. Alternatively, the anode electrode 20 may be designed to have smaller flat dimensions than the solid polymer electrolyte membrane 18 and the cathode electrode 22. In such a case, the anode electrode 20 serves as a second electrode and the cathode electrode 22 serves as a first electrode.

The anode electrode 20 includes a first electrode catalyst layer 20a joined to a surface 18a of the solid polymer electrolyte membrane 18 and a first gas diffusion layer 20b disposed on the first electrode catalyst layer 20a. The first electrode catalyst layer 20a and the first gas diffusion layer 20b have the same flat dimensions and are designed to have the same (or smaller) flat dimensions as (than) the solid polymer electrolyte membrane 18.

The cathode electrode 22 includes a second electrode catalyst layer 22a joined to a surface 18b of the solid polymer electrolyte membrane 18 and a second gas diffusion layer 22b disposed on the second electrode catalyst layer 22a. The second electrode catalyst layer 22a protrudes outward from an outer periphery end 22be of the second gas diffusion layer 22b and is designed to have larger flat dimensions than the second gas diffusion layer 22b and smaller flat dimensions than the solid polymer electrolyte membrane 18. The second electrode catalyst layer 22a includes an outer periphery exposed portion 22ao that extends outward so as to be exposed from the outer periphery end 22be.

The first electrode catalyst layer 20a is formed by, for example, evenly applying to a surface of the first gas diffusion layer 20b a mixture of an ion-conductive polymer binder and porous carbon particles carrying a platinum alloy on their surfaces. The second electrode catalyst layer 22a is formed by, for example, evenly applying to a surface of the second gas diffusion layer 22b a mixture of an ion-conductive polymer binder and porous carbon particles carrying a platinum alloy on their surfaces.

The first gas diffusion layer 20b and the second gas diffusion layer 22b are each formed of a carbon paper, a carbon cloth, or the like. The flat dimensions of the second gas diffusion layer 22b are set to be smaller than the flat dimensions of the first gas diffusion layer 20b. The first electrode catalyst layer 20a and the second electrode catalyst layer 22a are respectively formed on the two surfaces 18a and 18b of the solid polymer electrolyte membrane 18.

The resin-framed stepped MEA 10 includes a resin frame member (including a resin film) 24 that surrounds the outer periphery of the solid polymer electrolyte membrane 18 and is bonded to an outer peripheral portion 18be of the solid polymer electrolyte membrane 18.

The resin frame member 24 is formed of, for example, polyphenylene sulfide (PPS), polyphthalamide (PPA), polyethylene naphthalate (PEN), polyether sulfone (PES), liquid crystal polymer (LCP), polyvinylidene fluoride (PVDF), silicone resin, fluororesin, modified polyphenylene ether resin (m-PPE), polyethylene terephthalate (PET), polybutylene terephthalate (PBT), a modified polyolefin, or the like.

Figure 3:
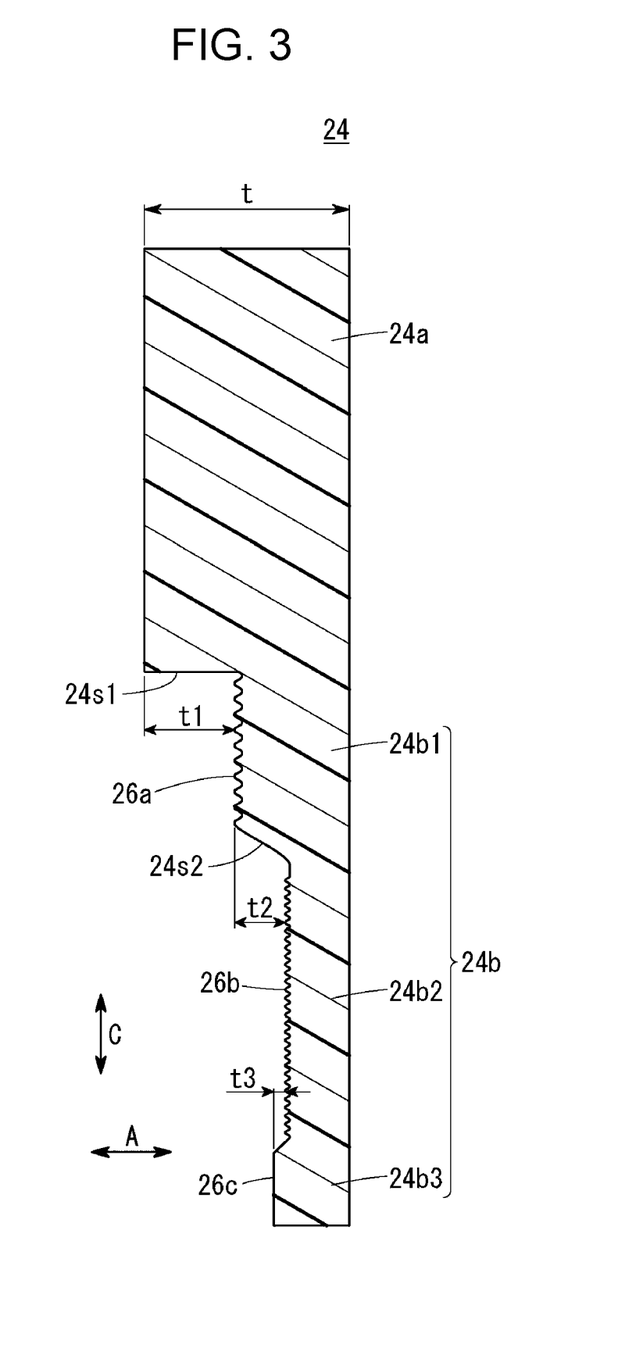
FIG. 3 is a diagram illustrating a resin frame member of the resin-framed stepped MEA.
Figure 4:
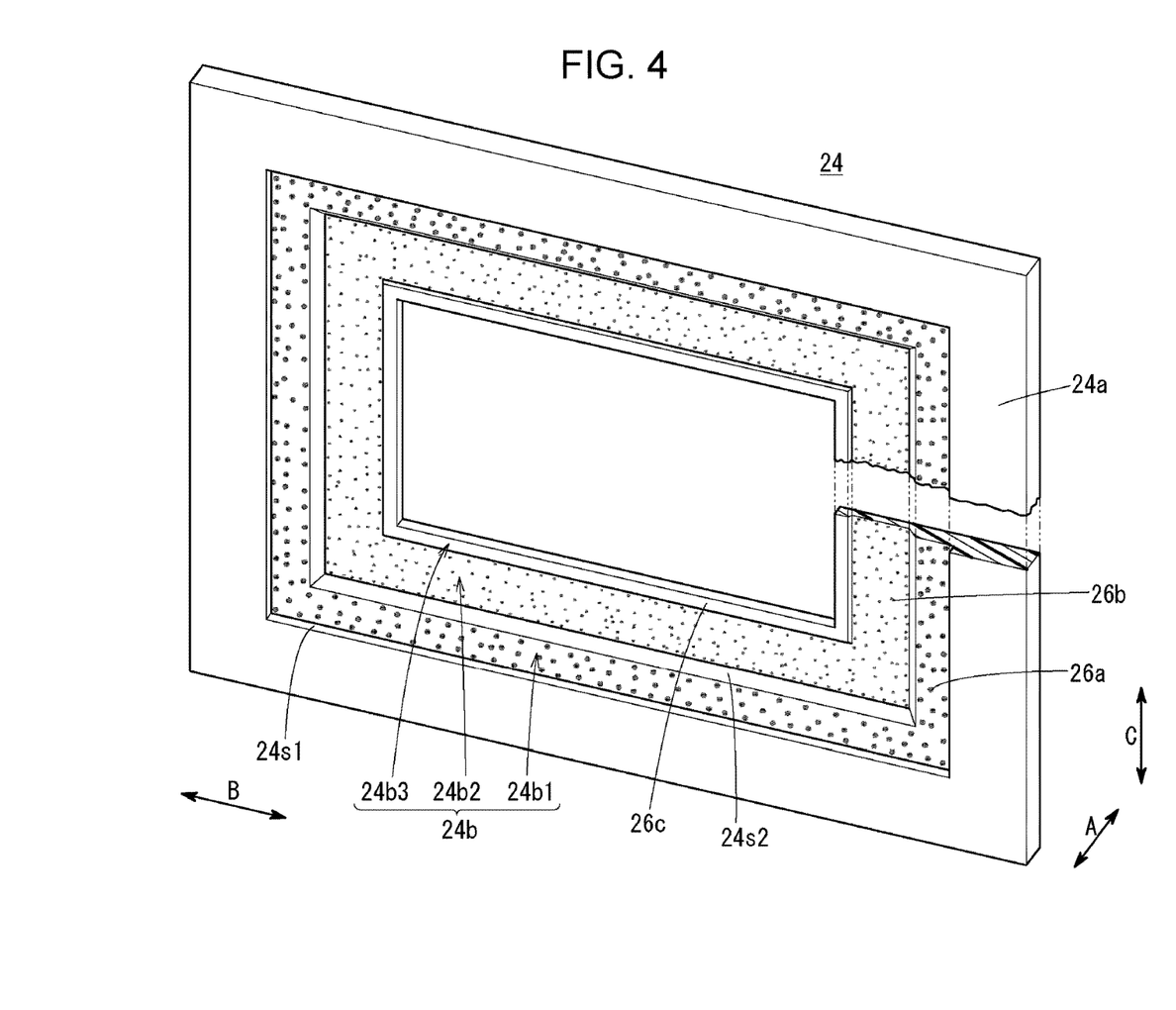
FIG. 4 is a perspective view of the resin frame member of the resin-framed stepped MEA.

As illustrated in FIGS. 2 to 4, the resin frame member 24 has a frame shape and has an outer peripheral portion 24a that extends a particular length inward from the outer peripheral end. An inner protruding portion 24b that protrudes toward the cathode electrode 22 is integrated with an inner end portion of the outer peripheral portion 24a.

As illustrated in FIG. 2, the inner protruding portion 24b has a ledge portion 24b1 that contacts the outer peripheral portion 18be of the solid polymer electrolyte membrane 18 through a first step portion 24s1. The thickness S1 of the ledge portion 24b1 is set to be larger than the thickness S2 of the cathode electrode 22 (S1>S2). A thin-walled groove portion 24b2 lies at the inner end portion of the ledge portion 24b1 and a second step portion 24s2 is provided between the groove portion 24b2 and the ledge portion 24b1. A bank portion 24b3 lies at the inner end portion of the groove portion 24b2. The bank portion 24b3 faces the outer periphery exposed portion 22ao of the second electrode catalyst layer 22a and extends throughout the entire circumference of the outer periphery exposed portion 22ao.

As illustrated in FIG. 3, the outer peripheral portion 24a of the resin frame member 24 has a thickness t, which is the dimension in the height direction (arrow A direction). The ledge portion 24b1 is set to be thinner than the outer peripheral portion 24a by a thickness t1 in the height direction. The groove portion 24b2 is set to be thinner than the ledge portion 24b1 by a thickness t2 in the height direction. The bank portion 24b3 is set to be thicker than the groove portion 24b2 by a thickness t3 in the height direction and the height of the bank portion 24b3 is smaller than the height of the ledge portion 24b1.

A textured surface, for example, a first grain-finished surface 26a, is formed in a surface of the ledge portion 24b1 facing the stepped MEA 10a. A textured surface, for example, a second grain-finished surface 26b, is formed in a surface of the groove portion 24b2 facing the stepped MEA 10a. A surface 26c of the bank portion 24b3 facing the stepped MEA 10a is formed to be substantially flat.

The surface roughness of the surface (tip) 26c of the bank portion 24b3 is smaller than the surface roughness of the second grain-finished surface (bottom surface) 26b of the groove portion 24b2. The surface roughness of the first grain-finished surface 26a of the ledge portion 24b1 is larger than the surface roughness of the second grain-finished surface 26b of the groove portion 24b2.

As illustrated in FIG. 2, the gap between the outer peripheral portion 18be on the surface 18b side of the stepped MEA 10a and the groove portion 24b2 is filled with an adhesive 28a which forms an adhesive layer 28. Examples of the adhesive 28a include polymers and fluorine-based elastomers. The adhesive 28a is not particularly limited and may be liquid or solid or thermoplastic or thermosetting.

The resin frame member 24 and the first gas diffusion layer 20b of the anode electrode 20 are integrated with each other with a resin-impregnated portion 30 that contains an adhesive resin. The resin-impregnated portion 30 can be, for example, formed by thermally deforming a resin protrusion 30t integral with the resin frame member 24. The adhesive 28a used to form the adhesive layer 28 may be used to form the resin-impregnated portion 30.

As illustrated in FIG. 1, an oxidant gas inlet manifold 32a, a cooling medium inlet manifold 34a, and a fuel gas outlet manifold 36b are formed in one end portion of the fuel cell 12 in the arrow B direction (horizontal direction). The oxidant gas inlet manifold 32a, the cooling medium inlet manifold 34a, and the fuel gas outlet manifold 36b each penetrate the first separator 14 and the second separator 16 in the arrow A direction, which is the stacking direction. Oxidant gas, for example, oxygen-containing gas, is supplied through the oxidant gas inlet manifold 32a. A cooling medium is supplied through the cooling medium inlet manifold 34a. Fuel gas, for example, hydrogen-containing gas, is discharged through the fuel gas outlet manifold 36b. The oxidant gas inlet manifold 32a, the cooling medium inlet manifold 34a, and the fuel gas outlet manifold 36b are aligned with each other in the arrow C direction (vertical direction).

A fuel gas inlet manifold 36a, a cooling medium outlet manifold 34b, and an oxidant gas outlet manifold 32b are formed in the other end portion of the solid polymer electrolyte fuel cell 12 in the arrow B direction. The fuel gas inlet manifold 36a, the cooling medium outlet manifold 34b, and the oxidant gas outlet manifold 32b each penetrate the first separator 14 and the second separator 16 in the arrow A direction (stacking direction). Fuel gas is supplied through the fuel gas inlet manifold 36a. A cooling medium is discharged through the cooling medium outlet manifold 34b. Oxidant gas is discharged through the oxidant gas outlet manifold 32b. The fuel gas inlet manifold 36a, the cooling medium outlet manifold 34b, and the oxidant gas outlet manifold 32b are aligned with one another in the arrow C direction.

An oxidant gas flow channel 38 is formed in a surface 16a of the second separator 16 facing the resin-framed stepped MEA 10. The oxidant gas flow channel 38 is in communication with the oxidant gas inlet manifold 32a and the oxidant gas outlet manifold 32b. The oxidant gas flow channel 38 includes multiple straight (or wavy) channel grooves that extend in the arrow B direction.

A fuel gas flow channel 40 is formed in a surface 14a of the first separator 14 facing the resin-framed stepped MEA 10. The fuel gas flow channel 40 is in communication with the fuel gas inlet manifold 36a and the fuel gas outlet manifold 36b. The fuel gas flow channel 40 includes multiple straight (or wavy) flow channel grooves that extend in the arrow B direction.

A cooling medium flow channel 42 is formed between a surface 14b of the first separator 14 and a surface 16b of the second separator 16 adjacent to each other. The cooling medium flow channel 42 is in communication with the cooling medium inlet manifold 34a and the cooling medium outlet manifold 34b.

As illustrated in FIGS. 1 and 2, a first seal member 44 covers outer peripheral end portions of the surfaces 14a and 14b of the first separator 14 to become combined with the first separator 14. A second seal member 46 covers outer peripheral end portions of the surfaces 16a and 16b of the second separator 16 to become combined with the second separator 16.

As illustrated in FIG. 2, the first seal member 44 includes a first protruding seal 44a in contact with the resin frame member 24 of the resin-framed stepped MEA 10 and a second protruding seal 44b in contact with the second seal member 46 of the second separator 16. The second seal member 46 constitutes a flat seal having a flat surface in contact with the second protruding seal 44b and this flat surface extends along the plane of the separator. Alternatively, instead of the second protruding seal 44b, a protruding seal (not illustrated) may be provided to the second seal member 46.

Examples of elastic seal members that can be used as the first seal member 44 and the second seal member 46 include sealing members, cushion materials, and packing materials formed of EPDM, NBR, fluororubber, silicone rubber, fluorosilicone rubber, butyl rubber, natural rubber, styrene rubber, chloroprene rubber, or acrylic rubber.

Next, a method for producing the resin-framed stepped MEA 10 is described.

First, the stepped MEA 10a is prepared. Separately, the resin frame member 24 is prepared by injection molding using a die (not shown). In preparing the stepped MEA 10a, a slurry containing a mixture of carbon black and PTFE particles is applied to flat surfaces of carbon paper sheets and dried to form undercoat layers which constitute the first gas diffusion layer 20b and the second gas diffusion layer 22b.

A solvent is added to an electrode catalyst, and a binder solution is added to the resulting mixture to form a cathode electrode ink and an anode electrode ink. The cathode electrode ink is applied to a PET film by screen printing so as to form a cathode electrode sheet. Similarly, the anode electrode ink is applied to a PET film by screen printing so as to form an anode electrode sheet.

Next, the solid polymer electrolyte membrane 18 as sandwiched between the cathode electrode sheet and the anode electrode sheet is hot pressed, and the PET films are separated to form a catalyst-coated membrane (CCM). The CCM is then sandwiched between the first gas diffusion layer 20b and the second gas diffusion layer 22b and hot-pressed to integrate the CCM with the first gas diffusion layer 20b and the second gas diffusion layer 22b. As a result, a stepped MEA 10a is obtained.

As illustrated in FIG. 4, the resin frame member 24 has the thin-walled inner protruding portion 24b. The inner protruding portion 24b includes the ledge portion 24b1, which is adjacent to the outer peripheral portion 24a with the first step portion 24s1 therebetween, and the groove portion 24b2 that lies at the inner end portion of the ledge portion 24b1. The second step portion 24s2 is provided between the ledge portion 24b1 and the groove portion 24b2. The inner protruding portion 24b also includes the bank portion 24b3 at the inner end portion of the groove portion 24b2. If needed, the resin protrusion 30t illustrated in FIG. 2 is formed as part of the resin frame member 24.

A surface of the ledge portion 24b1 of the resin frame member 24 formed by injection molding is subjected to a grain finishing treatment to form the first grain-finished surface 26a and the second grain-finished surface 26b is formed on the bottom surface of the groove portion 24b2. The first grain-finished surface 26a has a larger surface roughness than the second grain-finished surface 26b. The grain finishing treatment can be performed by using a plasma apparatus or the like, for example. Alternatively, although not illustrated in the drawings, textured patterns corresponding to the first grain-finished surface 26a and the second grain-finished surface 26b may be formed in the molding surfaces of the injection molding dies so that the first grain-finished surface 26a and the second grain-finished surface 26b can be formed at the time of preparing the resin frame member 24 by injection molding.

Figure 5:
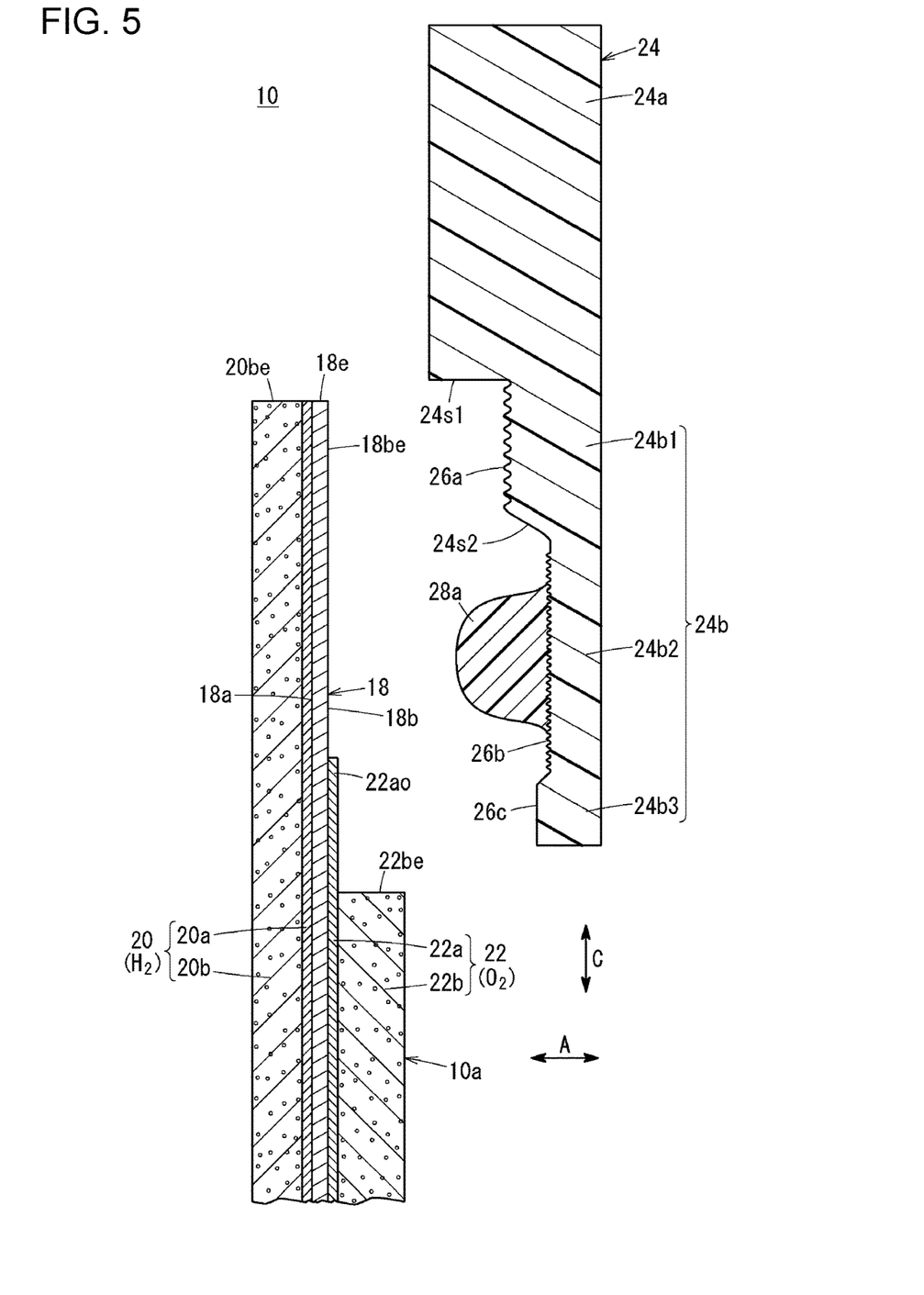
FIG. 5 is a diagram illustrating a method for producing the resin-framed stepped MEA.

Next, as illustrated in FIG. 5, the adhesive 28a is applied to the bottom surface (second grain-finished surface 26b) of the groove portion 24b2 of the inner protruding portion 24b of the resin frame member 24 by using, for example, a dispenser not shown in the drawing. Then the first step portion 24s1 of the resin frame member 24, an outer peripheral end portion 20be of the first gas diffusion layer 20b constituting the stepped MEA 10a, and an outer peripheral end portion 18e of the solid polymer electrolyte membrane 18 are aligned.

Figure 6:
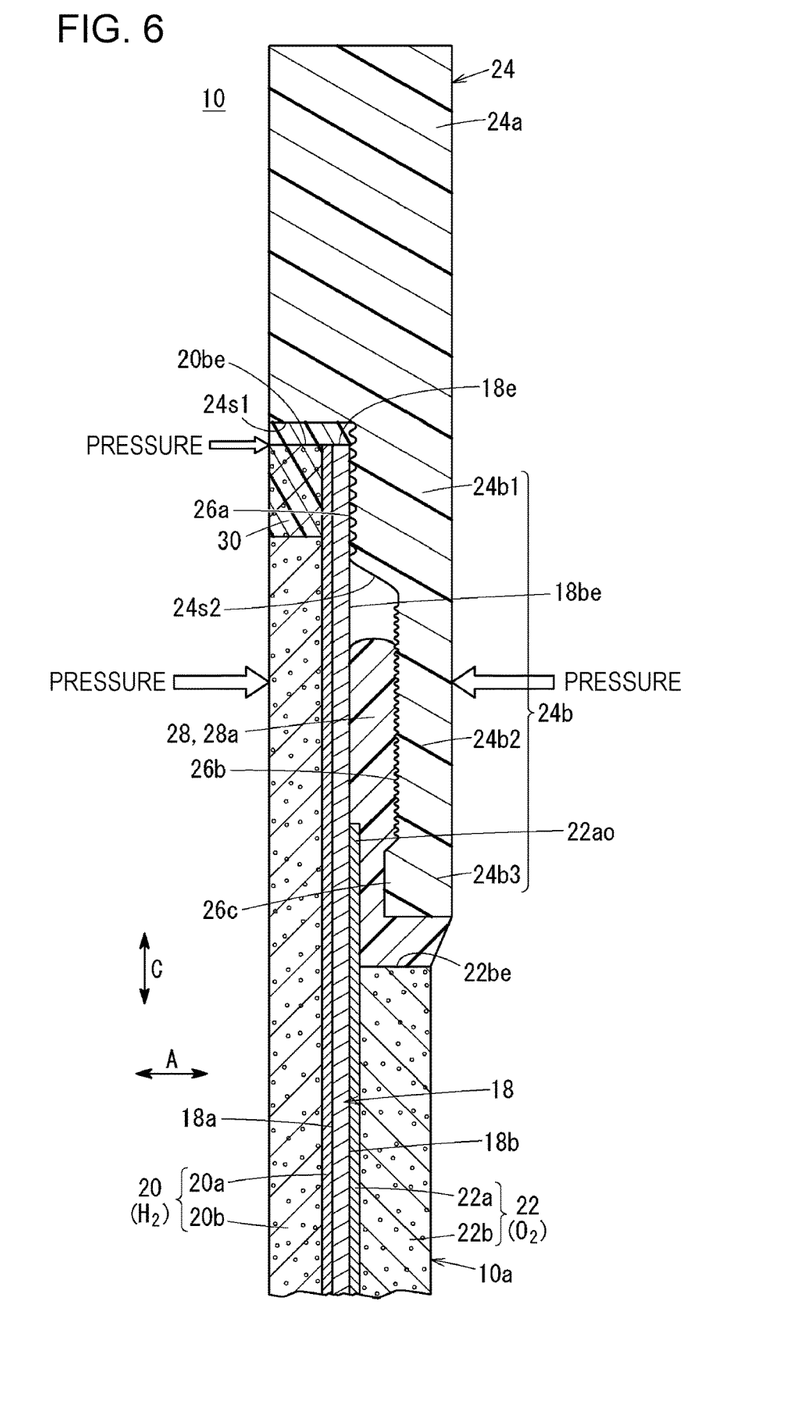
FIG. 6 is a diagram illustrating a method for producing the resin-framed stepped MEA.

As illustrated in FIG. 6, the adhesive 28a is heated and at the same time loaded with a pressure (using a press or the like) in the thickness direction. As a result, the adhesive 28a is pressurized and melted. The adhesive 28a is stretched inside the groove portion 24b2. Thus, the inner protruding portion 24b of the resin frame member 24 becomes bonded to the outer peripheral portion 18be of the solid polymer electrolyte membrane 18 with the adhesive layer 28.

The inner peripheral surface of the bank portion 24b3 of the resin frame member 24 and the tip surface of the outer periphery end 22be of the second gas diffusion layer 22b are bonded to each other with the adhesive layer 28. The resin frame member 24 and the first gas diffusion layer 20b of the anode electrode 20 are integrated with each other with a resin-impregnated portion 30. Thus, the resin-framed stepped MEA 10 is made.

In this embodiment, as illustrated in FIG. 3, the inner protruding portion 24b constituting the resin frame member 24 has the bank portion 24b3 at the inner peripheral end portion and the groove portion 24b2 is formed on the outer peripheral side of the bank portion 24b3. The surface roughness of the surface 26c of the bank portion 24b3 is smaller than the surface roughness of the second grain-finished surface 26b of the groove portion 24b2.

Since the surface roughness of the bank portion 24b3 is set to be small, dust rarely attaches thereto. As a result, attachment of dust and the like to the solid polymer electrolyte membrane 18 can be prevented by a simple structure and damage on the solid polymer electrolyte membrane 18 can be minimized.

In contrast, the surface roughness of the groove portion 24b2 is set to be large and thus the adhesive 28a smoothly flows within the groove portion 24b2. At the same time, air inside the adhesive 28a moves along with the flow of the adhesive 28a and is satisfactorily discharged to outside. As a result, variation in quality, such as gas barrier properties and adhesion durability, can be reduced and the stepped MEA 10a can be strongly bonded to the resin frame member 24 to achieve high quality.

Moreover, the first grain-finished surface 26a is formed in the surface of the ledge portion 24b1 facing the stepped MEA 10a and the surface roughness of the first grain-finished surface 26a is larger than the surface roughness of the second grain-finished surface 26b of the groove portion 24b2. Since the adhesive 28a does not reach the ledge portion 24b1 and thus the surface roughness of the ledge portion 24b1 can be set to be large, gas can be smoothly released. Thus, it becomes possible to reliably form a high-quality adhesive layer 28 free of air bubbles and the like.

The operation of the fuel cell 12 having such a structure will now be described.

First, as illustrated in FIG. 1, oxidant gas such as oxygen-containing gas is supplied through the oxidant gas inlet manifold 32a and at the same time fuel gas such as hydrogen-containing gas is supplied through the fuel gas inlet manifold 36a. A cooling medium such as pure water, ethylene glycol, or oil, is supplied through the cooling medium inlet manifold 34a.

As a result, the oxidant gas is introduced into the oxidant gas flow channel 38 of the second separator 16 through the oxidant gas inlet manifold 32a, moves in the arrow B direction, and is supplied to the cathode electrode 22 of the stepped MEA 10a. The fuel gas is introduced into the fuel gas flow channel 40 of the first separator 14 through the fuel gas inlet manifold 36a. The fuel gas moves in the arrow B direction along the fuel gas flow channel 40 and is supplied to the anode electrode 20 of the stepped MEA 10a.

Thus, in each stepped MEA 10a, the oxidant gas supplied to the cathode electrode 22 and the fuel gas supplied to the anode electrode 20 are consumed by electrochemical reactions within the second electrode catalyst layer 22a and the first electrode catalyst layer 20a and power is generated as a result.

The oxidant gas supplied to the cathode electrode 22 and partly consumed is discharged through the oxidant gas outlet manifold 32b in the arrow A direction. Similarly, the fuel gas supplied to the anode electrode 20 and partly consumed is discharged through the fuel gas outlet manifold 36b in the arrow A direction.

The cooling medium supplied to the cooling medium inlet manifold 34a is introduced into the cooling medium flow channel 42 between the first separator 14 and the second separator 16 and is distributed in the arrow B direction. This cooling medium cools the stepped MEA 10a and is discharged through the cooling medium outlet manifold 34b.

A resin-framed stepped membrane electrode assembly (MEA) for a fuel cell according to the present disclosure includes a stepped membrane electrode membrane (MEA) and a resin frame member. The stepped MEA includes a first electrode that is disposed on a surface of the solid polymer electrolyte membrane and includes a first electrode catalyst layer and a first gas diffusion layer, and a second electrode that is disposed on another surface of the solid polymer electrolyte membrane and includes a second electrode catalyst layer and a second gas diffusion layer.

The first electrode has flat dimensions larger than flat dimensions of the second electrode. The second electrode catalyst layer includes an outer periphery exposed portion that extends outward from an outer peripheral end of the second gas diffusion layer. The resin frame member surrounds an outer periphery of the solid polymer electrolyte membrane and includes an inner protruding portion protruding toward the second electrode and joined to the stepped MEA with an adhesive.

The inner protruding portion includes a bank portion disposed in an inner peripheral end portion of the inner protruding portion, the bank portion facing the outer periphery exposed portion of the second electrode catalyst layer. A groove portion is disposed on an outer peripheral side of the bank portion. A ledge portion is disposed on an outer peripheral side of the groove portion so as to contact an outer peripheral surface of the solid polymer electrolyte membrane, the outer peripheral surface being an exposed portion extending outward from the second electrode catalyst layer. A surface roughness of a tip of the bank portion is smaller than a surface roughness of a bottom surface of the groove portion.

Since the surface roughness of the bank portion is designed to be small, dust rarely attaches thereto. Thus, attachment of dust or the like on the solid polymer electrolyte membrane can be prevented by a simple structure and damage on the solid polymer electrolyte membrane can be minimized.

In contrast, the surface roughness of the groove portion is designed to be large. Thus, the adhesive flows smoothly inside the groove portion and air within the adhesive layer can be smoothly discharged to outside. Thus, variation in quality, such as gas barrier properties and adhesion durability, can be reduced, and the stepped MEA can be strongly bonded to the resin frame member to achieve high quality.

In the inner protruding portion of the resin-framed stepped MEA for a fuel cell described above, a height of the bank portion is preferably smaller than a height of the ledge portion.

In the inner protruding portion of the resin-framed stepped MEA for a fuel cell described above, a surface roughness of a tip of the ledge portion is preferably larger than the surface roughness of the bottom surface of the groove portion.

Obviously, numerous modifications and variations of the present invention are possible in light of the above teachings. It is therefore to be understood that within the scope of the appended claims, the invention may be practiced otherwise than as specifically described herein.

What is claimed is:

1. A resin-framed stepped membrane electrode assembly for a fuel cell, comprising:
   a stepped membrane electrode assembly that includes
      a solid polymer electrolyte membrane,
      a first electrode that is disposed on a surface of the solid polymer electrolyte membrane in a stacking direction and includes a first electrode catalyst layer and a first gas diffusion layer, and
      a second electrode that is disposed on another surface of the solid polymer electrolyte membrane in the stacking direction and includes a second electrode catalyst layer and a second gas diffusion layer, the first electrode having flat dimensions larger than flat dimensions of the second electrode, the second electrode catalyst layer including an outer periphery exposed portion extending outward from an outer peripheral end of the second gas diffusion layer; and
   a resin frame member that surrounds an outer periphery of the solid polymer electrolyte membrane and includes
      an inner protruding portion protruding toward the second electrode and joined to the stepped membrane electrode assembly with an adhesive, the inner protruding portion including
         a bank portion disposed in an inner peripheral end portion of the inner protruding portion, the bank portion facing the outer periphery exposed portion of the second electrode catalyst layer in the stacking direction,
         a groove portion disposed on an outer peripheral side of the bank portion, and
         a ledge portion disposed on an outer peripheral side of the groove portion so as to contact an outer peripheral surface of the solid polymer electrolyte membrane, the outer peripheral surface being an exposed portion extending outward from the second electrode catalyst layer,
   wherein the bank portion protrudes beyond the groove portion toward the stepped membrane electrode assembly in the stacking direction,
   wherein a surface roughness of a tip of the bank portion is smaller than a surface roughness of a bottom surface of the groove portion, and
   wherein, in the inner protruding portion, a surface roughness of a tip of the ledge portion is larger than the surface roughness of the bottom surface of the groove portion.

2. The resin-framed stepped membrane electrode assembly according to claim 1, wherein, in the inner protruding portion, a height of the bank portion is smaller than a height of the ledge portion.

3. A resin-framed stepped membrane electrode assembly for a fuel cell, comprising:
   a stepped membrane electrode assembly comprising:
      a solid polymer electrolyte membrane having a first surface and a second surface opposite to the first surface in a stacking direction;

a first electrode stacked on the first surface in the stacking direction and including a first electrode catalyst layer and a first gas diffusion layer; and a second electrode stacked on the second surface in the stacking direction and including a second electrode catalyst layer and a second gas diffusion layer, the first electrode being larger than the second electrode viewed in the stacking direction, the second electrode catalyst layer including an outer periphery exposed portion extending from a diffusion outer peripheral end of the second gas diffusion layer in a direction substantially perpendicular to the stacking direction viewed in the stacking direction; and a resin frame member surrounding a membrane outer periphery end of the solid polymer electrolyte membrane viewed in the stacking direction and including an inner protruding portion protruding from the membrane outer periphery end toward the second electrode viewed in the stacking direction and joined to the stepped membrane electrode assembly with an adhesive, the inner protruding portion comprising:

a bank portion disposed between the diffusion outer peripheral end and the membrane outer periphery end in the direction viewed in the stacking direction and having a bank surface opposite to the outer periphery exposed portion in the stacking direction;

a groove portion disposed between the bank portion and the membrane outer periphery end in the direction viewed in the stacking direction and having a groove surface opposite to the solid polymer electrolyte membrane in the stacking direction, the bank portion protruding beyond the groove portion toward the stepped membrane electrode assembly in the stacking direction, a roughness of the bank surface being smaller than a roughness of the groove surface; and a ledge portion disposed between the groove portion and the membrane outer periphery end in the direction viewed in the stacking direction so as to contact to the solid polymer electrolyte membrane in the stacking direction, wherein, in the inner protruding portion, a surface roughness of a tip of the ledge portion is larger than a surface roughness of the groove surface.

4. The resin-framed stepped membrane electrode assembly according to claim 3, wherein, in the inner protruding portion, a height of the bank portion is smaller than a height of the ledge portion.

5. The resin-framed stepped membrane electrode assembly according to claim 1, wherein the adhesive is provided between the groove portion and the outer peripheral end of the second gas diffusion layer and between the bank portion and the outer periphery exposed portion of the second electrode catalyst layer.

6. The resin-framed stepped membrane electrode assembly according to claim 3, wherein the adhesive is provided between the groove portion and the outer peripheral end of the second gas diffusion layer and between the bank portion and the outer periphery exposed portion of the second electrode catalyst layer.

* * * * *